United States Patent
Celton et al.

[11] Patent Number: 6,072,418
[45] Date of Patent: Jun. 6, 2000

[54] ELECTROMAGNETIC IN PARTICULAR RADAR EMISSION SENSORS, WITH REDUCED DOWNSTREAM FLOW RATE

[75] Inventors: René Celton; Franck Florin; Jean-Luc Kubiak; Fabienne Lancon, all of Brest, France

[73] Assignee: Thomson-CSF, Paris, France

[21] Appl. No.: 09/077,840

[22] PCT Filed: Oct. 6, 1997

[86] PCT No.: PCT/FR97/01780

§ 371 Date: Jun. 11, 1998

§ 102(e) Date: Jun. 11, 1998

[87] PCT Pub. No.: WO98/16843

PCT Pub. Date: Apr. 23, 1998

[30] Foreign Application Priority Data

Oct. 11, 1996 [FR] France ..................... 96 12427

[51] Int. Cl.[7] .................. G01S 7/292; G01S 7/40
[52] U.S. Cl. ................. 342/13; 342/159; 342/192; 342/195
[58] Field of Search ............... 342/13, 20, 147, 342/159, 173, 189, 192, 194, 195

[56] References Cited

U.S. PATENT DOCUMENTS

| | | | |
|---|---|---|---|
| 3,818,478 | 6/1974 | Groginsky | 342/398 |
| 3,939,472 | 2/1976 | Groginsky | 342/408 |
| 4,035,724 | 7/1977 | Stephenne et al. | 375/251 |
| 5,291,202 | 3/1994 | McClintock | 342/16 |
| 5,293,168 | 3/1994 | Faulkner | 342/145 |
| 5,327,366 | 7/1994 | Mau | 708/321 |

*Primary Examiner*—John B. Sotomayor
*Attorney, Agent, or Firm*—Oblon, Spivak, McClelland, Maier & Neustadt, P.C.

[57] ABSTRACT

The present invention relates to a detector of electromagnetic emissions, especially from radars, with reduced upstream bit rate. The detector comprises, between means (1) for the acquisition of the electromagnetic pulses received and extraction means (2) which group together the pulses relating to each emission, bit rate reduction means (4) comprising means (41) of characterization and compression of the trains with high recurrence frequency (HRF). Applications include detection, location and identification of surrounding radar electromagnetic emissions.

20 Claims, 2 Drawing Sheets

ELECTROMAGNETIC IN PARTICULAR RADAR EMISSION SENSORS, WITH REDUCED DOWNSTREAM FLOW RATE

BACKGROUND OF THE INVENTION

1. Field of the Invention

The present invention relates to a detector of electromagnetic emissions. It applies in particular to detectors of radars whose objective is to detect, locate and identify the surrounding radar electromagnetic emissions.

2. Discussion of the Background

By contrast with telecommunications signals, intercepted radar emissions consist essentially of trains of pulses which are characteristic of the emitting radar and of its mode of operation. Within this context, radar detectors generally comprise at least three parts which carry out their processing operations sequentially.

A first part carries out acquisition from instantaneous electromagnetic measurements. This acquisition characterizes the pulses received by supplying an estimate of their characteristic parameters, for example the mean frequency, the pulse length, the azimuth, the power level or any modulations that there may be.

A second part carries out the extraction which groups together the pulses relating to each radar emission, separates the various emissions received and characterizes the tracks thus formed, for example by the repetition period and the type of emission mode.

A third part carries out the identification which determines the characteristics of the intercepted radars and of their modes of operation.

The known means of extraction generally employ two essential sub-functions:
 a first sub-function performs a sort or pre-processing which groups together the pulses by blocks or classes each presumed to contain the pulses relating to the same emission,
 a second sub-function performs an analysis which details the characteristics of the emissions thus extracted.

The sort is done using fast processing carried out for example with microprogrammed hard-wired logic. It pertains to the parameters of each pulse emanating from the acquisition. These parameters are referred to as the primary parameters, for example. The sorting means comprise for example a bank of digital filters, each of which receives all of the pulses emanating from the acquisition and compares the primary parameters of each pulse with brackets characteristic of the filter. A specified radar, defined by a set of brackets pertaining to the primary parameters, is for example associated with each filter. When a pulse is recognized by a filter, it is for example put into a specific memory block associated with this filter.

The number of elementary operations required per second to carry out these sorting operations depends in particular on the pulse density at input and on the number of filters, and hence on the number of radars handled. The computational power required may in particular be as high as a billion elementary operations per second, thereby requiring the development of specific components. These constraints prove to be very expensive and rather incompatible with the cost reductions which are increasingly demanded by the market.

SUMMARY OF THE INVENTION

The object of the invention is in particular to enable sorting by the extraction means while limiting the number of elementary operations and simultaneously complying with the constraints of specifications pertaining to the pulse density at input which may be as high as a thousand million pulses per second for example.

To this end, the invention inserts, between the acquisition means and the extraction means, bit rate reduction means which eliminate some of the redundant information contained in the strings of pulses received.

More precisely, the subject of the invention is a detector of electromagnetic emissions, characterized in that it comprises, between means for the acquisition of the electromagnetic pulses received and extraction means which group together the pulses relating to each emission, bit rate reduction means comprising means of characterization of the strings of pulses with high recurrence frequency and of compression of the corresponding data.

The main advantages of the invention are that it greatly reduces the bit rate of information input to the extraction means, that it is simple to implement and that it is economical.

BRIEF DESCRIPTION OF THE DRAWINGS

Other characteristics and advantages of the invention will emerge with the aid of the description which follows, given in conjunction with the appended drawings which represent.

DETAILED DESCRIPTION OF THE PREFERRED EMBODIMENTS

Figure 1:
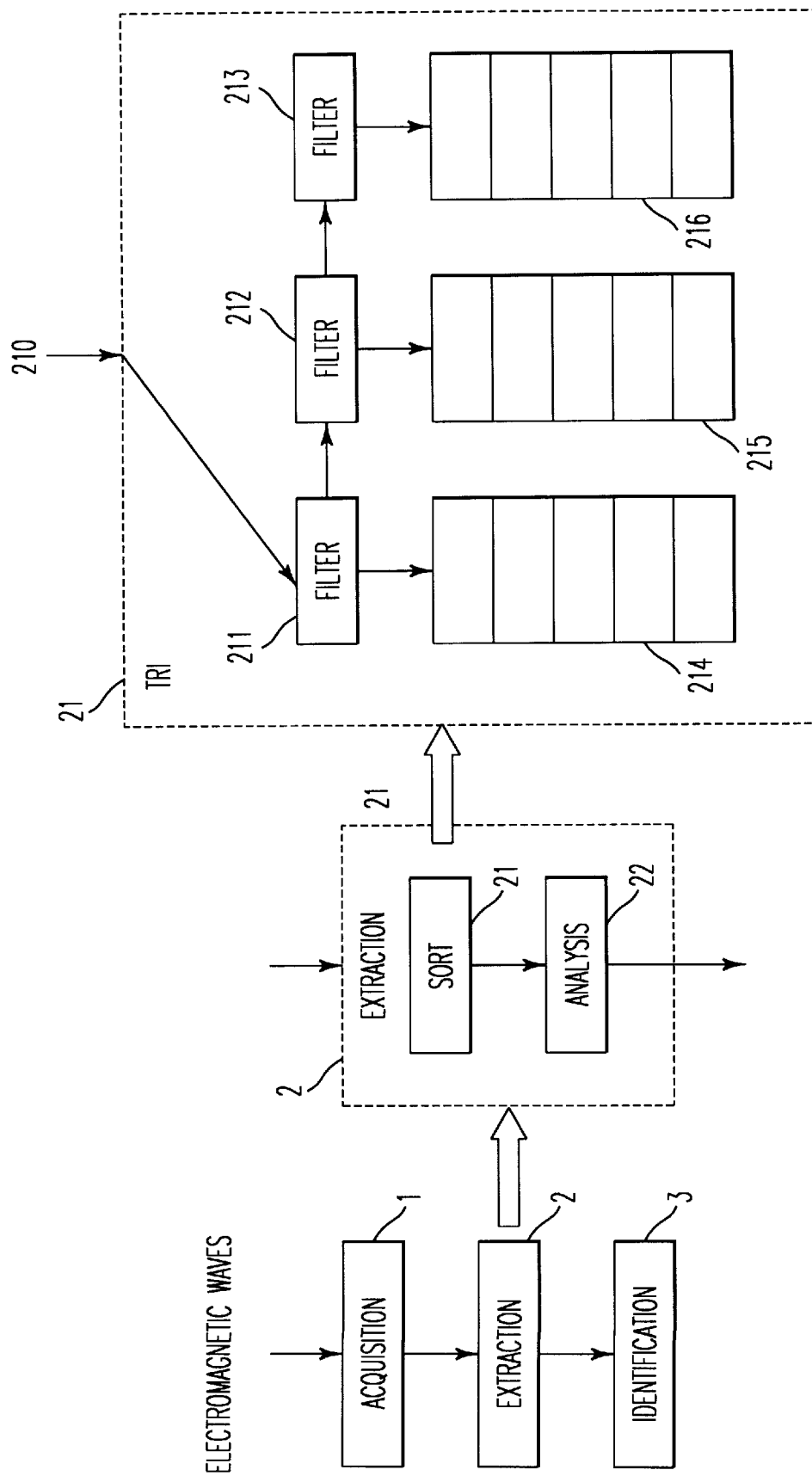
FIG. 1, an example of a detector of radars according to the prior art.

FIG. 1 illustrates, through a schematic diagram, a processing chain of an example of a detector of radars and in particular of its extraction function, according to the prior art.

The acquisition means 1 receive the electromagnetic waves emitted in particular by radars. These means characterize the pulses received by supplying an estimate of their characteristic parameters, such as in particular the mean frequency, the pulse length, the azimuth, the power level and any modulations that there may be.

The output of the acquisition means 1 is linked to the input of the extraction means 2. The latter group together the pulses relating to each radar emission, separate the various emissions received and characterize the tracks thus formed, especially by the repetition period and the type of emission mode.

The output of the extraction means 2 is linked to the input of the identification means 3 which give the characteristics of the radars intercepted and of their modes of operation.

The extractor 2 comprises sorting means 21 and analysis means 22. The sorting means 21 group together the pulses by blocks or classes each presumed to contain the pulses relating to the same emission, and then the analysis means 22 detail the characteristics of the emissions thus sorted.

The sorting means 21 have their input 210 linked to the output of the acquisition means 1. The sort thus pertains to the parameters of each pulse arising from the acquisition means. These parameters will be referred to subsequently as the primary parameters. The sorting means 21 comprise a bank of filters 211, 212, 213 each of which receives all the pulses emanating from the acquisition means and compares the parameters of each pulse with brackets characteristic thereof. A specified radar, defined by a set of brackets pertaining to the primary parameters, is associated with each filter 211, 212, 213. When a pulse is recognized by a filter, it is put into a specific memory block 214, 215, 215 associated with each filter 211, 212, 213.

Figure 2:
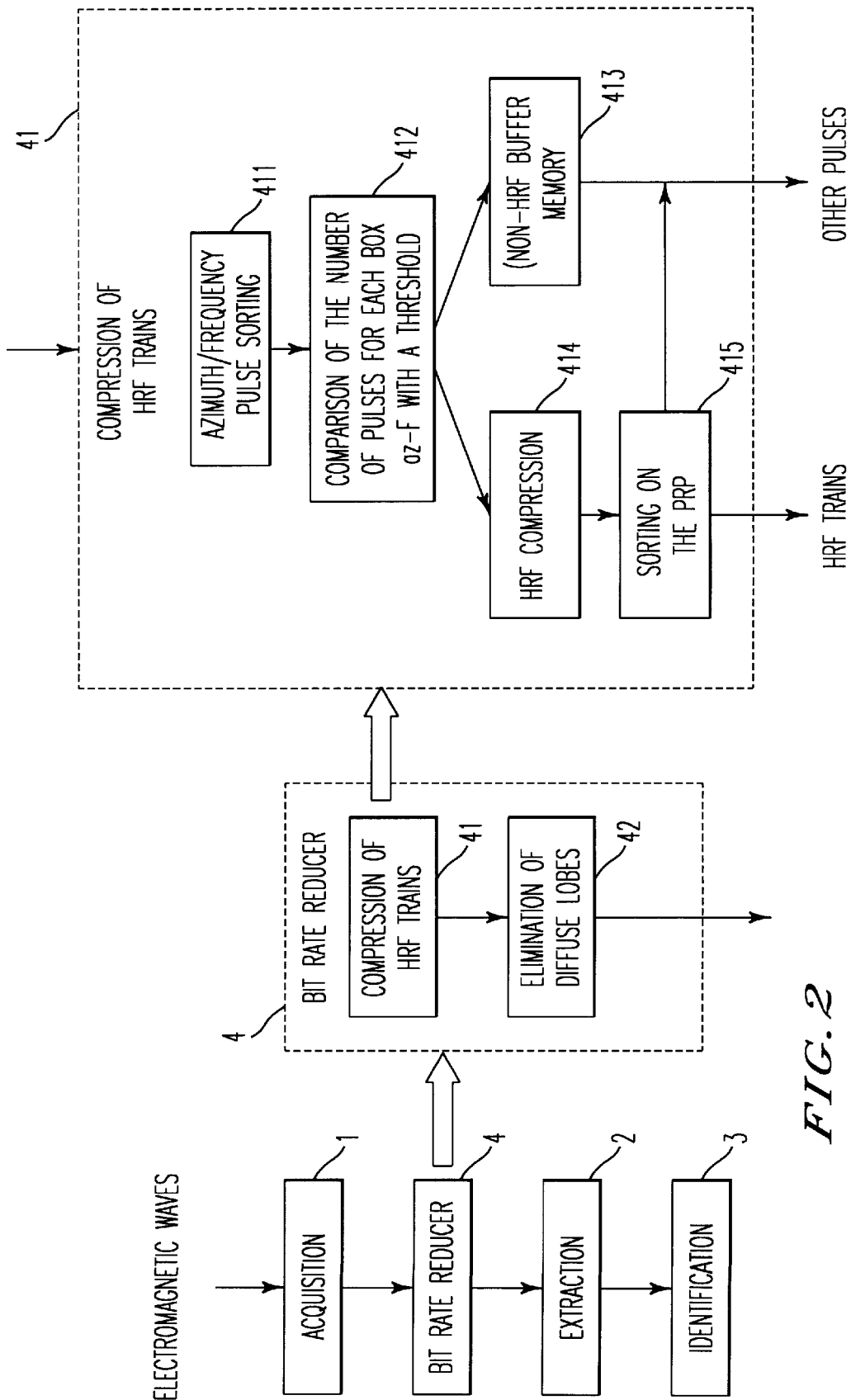
FIG. 2, an example of a detector of radars according to the invention.

FIG. 2 illustrates, through a schematic diagram, an example of a detector according to the invention.

Bit rate reduction means 4 are inserted between the acquisition means 1 and the extraction means 2. These bit rate reduction means 4 eliminate some of the redundant information contained in the strings of pulses received. To this end they comprise, for example, means 41 of characterization of the strings of pulses with high recurrence frequency, subsequently termed the "HPF train", and of compression of the corresponding data, and means 42 for eliminating pulses which correspond to diffuse lobes of radars already identified with regard to their main lobes. The sorting operations performed downstream by the extraction means 2 handle the HRF train as a single pulse supplied by the bit rate reduction means 4.

At the output of the acquisition means 1, an intercepted radar pulse is for example characterized by a set of primary parameters, which include in particular:

the instant at which the pulse starts, the azimuth, the length of the pulse, the frequency, the mean power level of the pulse, the modulation band within the pulse, measurement control indicators.

These primary parameters, which constitute around eight words, are forwarded, for each pulse, to the input of the bit rate reduction means 4 and in particular, for example, to the input of the means 41 of compression of the HRF trains.

The means 41 of characterization and compression of the HRF trains carry out for example an acquired-signal processing of a fixed duration T, of size adapted to the duration of the steady state of the intercepted pulse trains. The duration T is for example equal to 1 ms.

The compression means 41 comprise means 411 for sorting the pulses in the azimuth/frequency plane. These means 411 comprise a memory which stores a two-dimensional histogram, that is to say a distribution table, pertaining to the instantaneous-frequency and azimuth primary parameters supplied by the acquisition means 1. The pulse sorting means 411 produce this histogram from the pulses received over the aforementioned duration T. The table containing the histogram is for example an incremental table which handles the entire set of possible azimuth/frequency boxes. The addressing of each box of this table is for example carried out in real time by straightforward transcoding of the words corresponding to the azimuth and frequency primary parameters bracketed with each pulse acquired. The azimuth/frequency box of the pulse is instantaneously identified and incremented by 1.

Subsequent to the means 411 for sorting the pulses in the azimuth/frequency plane, the compression means 41 comprise means 412 for comparing the number of pulses for each box of the two-way histogram with a given threshold. These comparison means 412 therefore pinpoint the HRF emissions present, the latter corresponding to the boxes of the histogram whose level exceeds the given threshold. A secondary table handles for example the addresses of the non-zero azimuth/frequency boxes, this being so that the comparison with the decision threshold relating to the HRF property is performed faster. The detected emissions are thus distributed into two classes, an HRF emission class and a non-HRF emission class.

The data on the non-HRF emissions are for example transmitted without modification to the extraction means 2. To this end, the means 41 for compressing the HRF trains comprise for example a buffer memory 413 for temporary storage of the data on the non-HRF emissions before they are processed by the extraction means 2.

The HRF trains are for example processed in two operations. Means 414 of compression proper execute the calculation of parameters of the HRF train, in particular the pulse repetition period. The second operation is carried out by means 415 for sorting relating to the pulse repetition period PRP. These means 415 sort the pulses which do not belong to the HRF train but are present in the same azimuth/frequency box of the aforementioned two-dimensional histogram. This sort is performed on the basis of the estimate of the pulse repetition period PRP of the HRF train. When the instant of arrival of a pulse does not correspond to the repetition period of the train, it is classed as not belonging to the HRF train and is transmitted separately to the extraction means 2. Each HPF train isolated by the azimuth/frequency filtering is for example processed by a microprocessor which calculates the repetition period of the pulses of the train and isolates the nuisance pulses within the train which do not correspond to the HRF emission.

The pulses can for example be sorted on the basis of primary parameters other than azimuth and frequency, numbering other than two for example. The sorting of the pulses can also be based on quantities other than the primary parameters associated with the pulses, it can in particular be based on the values of the raw electromagnetic measurements of the sampled signal received.

Typically, the duration of coherence of a pulse train is for example 1 ms. For an HRF train, 1 ms of signal represents around 200 pulses. A pulse train can be characterized for example, and non-limitingly, by the following parameters which are calculated by the compression means 414:

the instant at which the train starts, the instant at which the train ends, the number of pulses in the train, the mean azimuth and its dispersion, the mean pulse length and its dispersion, the mean frequency and its dispersion, the mean repetition period PRP and its dispersion, the characteristics of the law for the changes in the mean level of the pulses over the duration of the train, in particular the mean value, the slope and the mean square error about the mean line, or more simply the mean level and its dispersion.

All these parameters require around 14 words per pulse train, i.e. for example 16 words on adding control indicators. These words are determined by the compression means 414 and then supplied to the extraction means 2. A set of 16 words for example characterizes an HRF train.

Hence, for a train of 200 pulses of 8 words, i.e. 1600 words, we have only 16 words, i.e. a reduction by a factor of 100 in the rate of bytes per second.

The bit rate reduction means 4 can for example also comprise means 42 for eliminating the pulses which correspond to diffuse lobes. These means 42 can be installed upstream or downstream of the HRF train compression means 41.

The means 42 for eliminating the diffuse lobes comprise for example a threshold. When a pulse is present in an azimuth/frequency box identical to that of a radar emission with high frequency of resolution or which has not yet been characterized, and when its power level is below the aforementioned threshold, the pulse is eliminated from the processing. A table of the azimuth/frequency boxes is for example available and handled by the extraction means 2. The threshold can also for example be handled downstream by the extraction means. Moreover, it may be adapted to each emission sought.

In a variant embodiment, the elimination means 42 do not eliminate the pulses of low level only, but also for example those of higher level. The elimination means 42 comprise for example an upper threshold allowing the elimination of pulses which are present in a box of the histogram and are identical to an emission already identified, and whose level is greater than this aforementioned upper threshold.

We claim:

1. Detector of electromagnetic radar emissions, characterized in that it comprises, between means for the acquisition of the electromagnetic pulses received and extraction means which group together the pulses relating to each emission, bit rate reduction means comprising means of characterization of the strings of pulses with high recurrence frequency and of compression of the corresponding data.

2. Detector according to claim 1, characterized in that the means of characterization and compression of the data relating to strings of pulses with high recurrence frequency comprise means for sorting the pulses which produce a histogram pertaining to primary parameters supplied by the acquisition means, and means for comparing the number of pulses for each box of the histogram with a given threshold, the strings of pulses with high recurrence frequency corresponding to the boxes of the histogram whose number of pulses exceeds the given threshold.

3. Detector according to claim 2, characterized in that the histogram is contained in memory in an incremental table, the addressing of each box of this table being carried out in real time by transcoding the words corresponding to certain of the primary parameters bracketed with each pulse acquired.

4. Detector according to claim 2, characterized in that the primary parameters used are the frequency and the azimuth.

5. Detector according to claim 2, characterized in that the sorting means sort the pulses which do not belong to a train with high recurrence frequency but do belong to the same box of the histogram.

6. Detector according to claim 1, characterized in that the bit rate reduction means comprise means for eliminating pulses which correspond to diffuse lobes of radars already identified.

7. Detector according to claim 2, characterized in that the means for eliminating the pulses which correspond to diffuse lobes comprise a threshold, a pulse being eliminated from the processing when it is present in a histogram box identical to that of an emission already identified, and when its power level is below the aforementioned threshold.

8. Detector according to claim 7, characterized in that the means for eliminating the pulses corresponding to diffuse lobes comprise an upper threshold allowing the elimination of pulses which are present in a box of the histogram and are identical to an emission already identified, and whose level is greater than this aforementioned upper threshold.

9. Detector according to claim 3, characterized in that the primary parameters used are the frequency and the azimuth.

10. Detector according to claim 2, characterized in that the data of the strings of pulses which do not have high recurrence frequency are transmitted without modification to the extraction means.

11. Detector according to claim 3, characterized in that the data of the strings of pulses which do not have high recurrence frequency are transmitted without modification to the extraction means.

12. Detector according to claim 4, characterized in that the data of the strings of pulses which do not have high recurrence frequency are transmitted without modification to the extraction means.

13. Detector according to claim 2, characterized in that the characterization and compression means include compression means which, for each string of pulses with high recurrence frequency, calculate a set of parameters characterizing this train, this set of parameters being supplied to the extraction means.

14. Detector according to claim 3, characterized in that the characterization and compression means include compression means which, for each string of pulses with high recurrence frequency, calculate a set of parameters characterizing this train, this set of parameters being supplied to the extraction means.

15. Detector according to claim 4, characterized in that the characterization and compression means include compression means which, for each string of pulses with high recurrence frequency, calculate a set of parameters characterizing this train, this set of parameters being supplied to the extraction means.

16. Detector of electromagnetic emissions, characterized in that it comprises, between means for the acquisition of the electromagnetic pulses received and extraction means which group together the pulses relating to each emission, bit rate reduction means comprising means of characterization of the strings of pulses with high recurrence frequency and of compression of the corresponding data, wherein the data of the strings of pulses which do not have high recurrence frequency are transmitted without modification to the extraction means.

17. Detector according to claim 16, characterized in that the characterization and compression means include compression means which, for each string of pulses with high recurrence frequency, calculate a set of parameters characterizing this train, this set of parameters being supplied to the extraction means.

18. Detector of electromagnetic emissions, characterized in that it comprises, between means for the acquisition of the electromagnetic pulses received and extraction means which group together the pulses relating to each emission, bit rate reduction means comprising means of characterization of the strings of pulses with high recurrence frequency and of compression of the corresponding data, wherein the characterization and compression means include compression means, which for each string of pulses with high recurrence frequency, calculate a set of parameters characterizing this train, this set of parameters being supplied to the extraction means.

19. Detector according to claim 18, characterized in that the set of parameters containing the pulse repetition period, the characterization and compression means comprise sorting means relating to the repetition period, these means sorting the pulses which do not belong to a string of pulses with high recurrence frequency.

20. Detector according to claim 19, characterized in that the sorting means sort the pulses which do not belong to a train with high recurrence frequency but do belong to the same box of the histogram.

* * * * *